(12) United States Patent
Heine et al.

(10) Patent No.: US 6,427,605 B1
(45) Date of Patent: Aug. 6, 2002

(54) STORAGE COMPARTMENT FOR A CONTAINER, ESPECIALLY IN A MOTOR VEHICLE

(75) Inventors: Daniel Heine, Dornstetten; Ruediger Widulle, Munich, both of (DE)

(73) Assignees: Fischerwerke Artur Fischer GmbH & Co. KG, Waldachtal; Bayerische Motoren Werke AG, Munich, both of (DE)

( * ) Notice: Subject to any disclaimer, the term of this patent is extended or adjusted under 35 U.S.C. 154(b) by 11 days.

(21) Appl. No.: 09/650,833

(22) Filed: Aug. 30, 2000

(30) Foreign Application Priority Data

Sep. 7, 1999 (DE) .......................................... 199 42 629

(51) Int. Cl.[7] .............................................. A47B 85/00
(52) U.S. Cl. ...................................................... 108/26
(58) Field of Search ........................... 108/44, 45, 165, 108/24, 28; 312/246, 270.2, 249.7

(56) References Cited

U.S. PATENT DOCUMENTS

| | | | | |
|---|---|---|---|---|
| 1,951,261 A | * | 3/1934 | Thompson | |
| 2,586,543 A | * | 2/1952 | Kennedy | |
| 5,427,447 A | * | 6/1995 | Satoh | 108/45 X |
| 5,671,686 A | * | 9/1997 | Hurley et al. | 108/45 |
| 6,309,038 B1 | * | 10/2001 | Domenig | 312/246 |

* cited by examiner

Primary Examiner—Jose V. Chen
(74) Attorney, Agent, or Firm—Michael J. Striker

(57) ABSTRACT

A storage compartment has a bottom pivotable by a first hinged joint out of a substantially horizontal position into a substantially vertical position. A wall is pivotably mounted by a second hinged joint on the bottom and pivotable out of a position lying flat against said bottom into a position standing away from the bottom. A driving mechanism pivots the wall out of the position lying flat against the bottom into the position standing away from the bottom, and vice versa, as the bottom is pivoted out of the substantially vertical position into the substantially horizontal position.

6 Claims, 4 Drawing Sheets

STORAGE COMPARTMENT FOR A CONTAINER, ESPECIALLY IN A MOTOR VEHICLE

BACKGROUND OF THE INVENTION

The present invention relates to a storage compartment for a container, especially in a motor vehicle.

More particularly it relates to a storage compartment which is intended in particular for mounting on an inner side of a side wall of the container, while the container can be housed, for example beneath a central armrest in the motor vehicle. The storage compartment is intended, for example, for the storage of small items in a larger container.

Such storage compartments are known in the art. The known storage compartments have a disadvantage that they require a substantial space in a larger container.

SUMMARY OF THE INVENTION

Accordingly, it is an object of present invention to provide a storage compartment for a container, especially in a motor vehicle, which is designed so that it can be housed with a minimal use of space in the larger container.

In keeping with these objects and with others which will become apparent hereinafter, one feature of present invention resides, briefly stated, in a storage compartment which has a bottom pivotable by a first hinged joint out of an substantially horizontal position into a substantially vertical position; a wall pivotably mounted by a second hinged joint on said bottom and pivotable out of a position lying flat against said bottom into a position standing away from said bottom; a driving mechanism which, as said bottom is pivoted out of the substantially vertical position into the substantially horizontal position, pivots said wall out of said position lying flat against said bottom into said position standing away from said bottom, and vice versa.

The storage compartment according to the invention is pivotable onto the inner side of the side wall of the container, on which the storage compartment is mounted, so that the storage compartment occupies only little space when not in use. For that purpose, the storage compartment according to the invention has a bottom that is pivotable by means of a hinged joint out of an approximately horizontal position standing away from the side wall into the container, into an approximately vertical position lying flat against the inner side of the side wall of the container. When not in use, the bottom is pivoted against the side wall of the container, so that the entire volume of the container is available as a storage space.

In accordance with the present invention one wall of the storage compartment is pivotally mounted on the bottom of the storage compartment, and is pivotable out of position standing away from the bottom into a position lying flat against the bottom. When the storage compartment is not in use, the wall is pivoted to rest on the bottom and the bottom is pivoted into its approximately vertically upright position.

Furthermore, the storage compartment according to the invention has a driving mechanism (gear mechanism) which positively co-ordinates the pivoting movements of the wall and bottom of the storage compartment with one another, so that, as the bottom is pivoted from the approximately vertical position into the approximately horizontal position, the wall of the storage compartment pivots out of the position lying flat against the bottom into the position standing away from the bottom. If the bottom is pivoted out of the approximately horizontal into the approximately vertical position, the driving mechanism pivots the wall out of the position standing away from the bottom into the position lying flat against the bottom. The invention has the advantage that it offers an opportunity for a container to be divided up and enables small items to be stored tidily in a larger container, wherein, when not in use, the storage compartment according to the invention can be housed with a minimum use of space against the inner side of a side wall of the container.

In accordance with one embodiment of the invention, the driving mechanism comprises a cam mechanism. In a development thereof, the cam mechanism has a fixed guideway in a plane perpendicular to a pivot axis of the bottom. The guideway runs in an arc about the pivot axis of the bottom at a changing distance therefrom. The wall of the storage compartment has a guide element, for example, a laterally projecting guide pin, which engages in the guideway. By virtue of the cam mechanism, an angular position of the wall relative to the bottom of the storage compartment is dependent on the pivoted angle of the bottom, and the pivoting movement of the wall is necessarily derived from the pivoting movement of the bottom, so that the wall stands away from the bottom when the latter takes up its approximately horizontal position, and so that the wall lies flat against the bottom when the latter takes up its approximately vertical position.

In a preferred embodiment of the invention, the bottom of the storage compartment has an overload protection means, which supports the bottom in the approximately horizontal position. If the storage compartment is overloaded, for example, because a heavy object is placed on the storage compartment, the overload protection means gives way, so that the bottom is able to fold away downwards. Damage to the storage compartment is consequently avoided.

In another preferred embodiment, the bottom of the storage compartment is pressed by a spring mechanism into the approximately horizontal position and the wall is passed into the position standing away from the bottom. When not in use, the bottom is held by a releasable holding arrangement in the approximately vertical position. The releasable holding arrangement can comprise, for example, a snap-action projection, which is pressed away resiliently to the side when the bottom is pressed out of the approximately vertical position towards the horizontal position. After overcoming the holding arrangement, the bottom pivots under spring action into its approximately vertical position. Push-push or cardioid locking mechanisms known per se can also be used as releasable holding arrangement.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
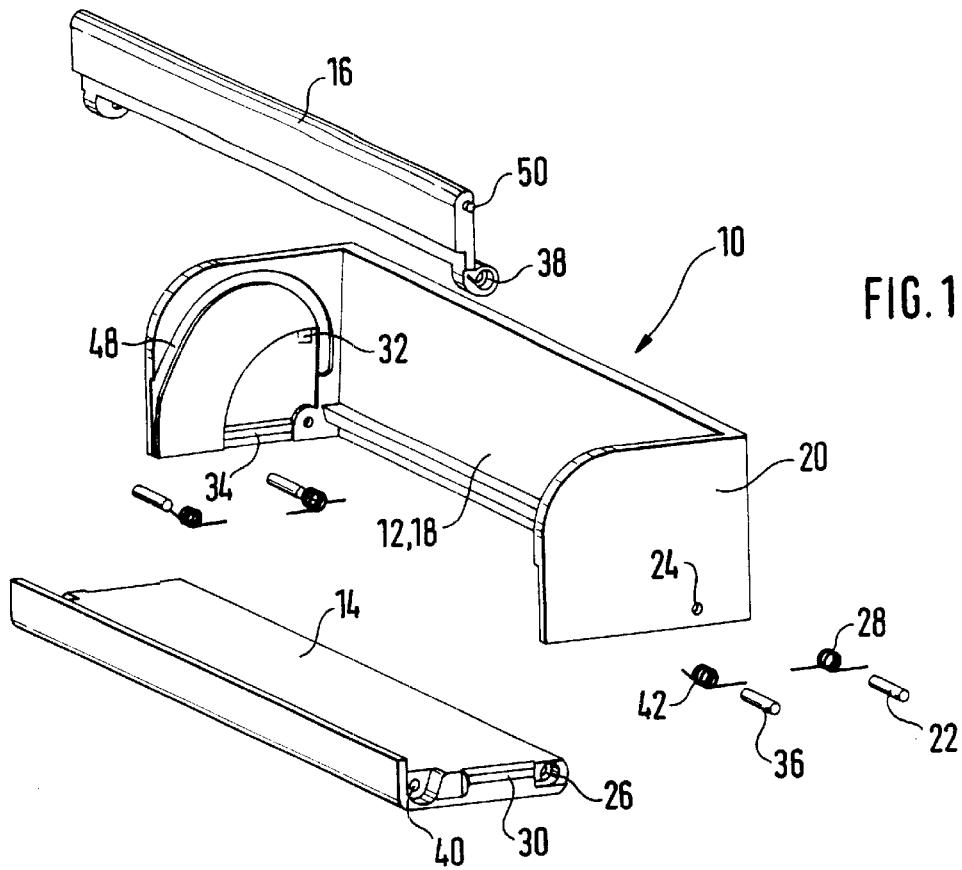
FIG. 1 is a perspective exploded view of a storage compartment according to the invention.
Figure 1:
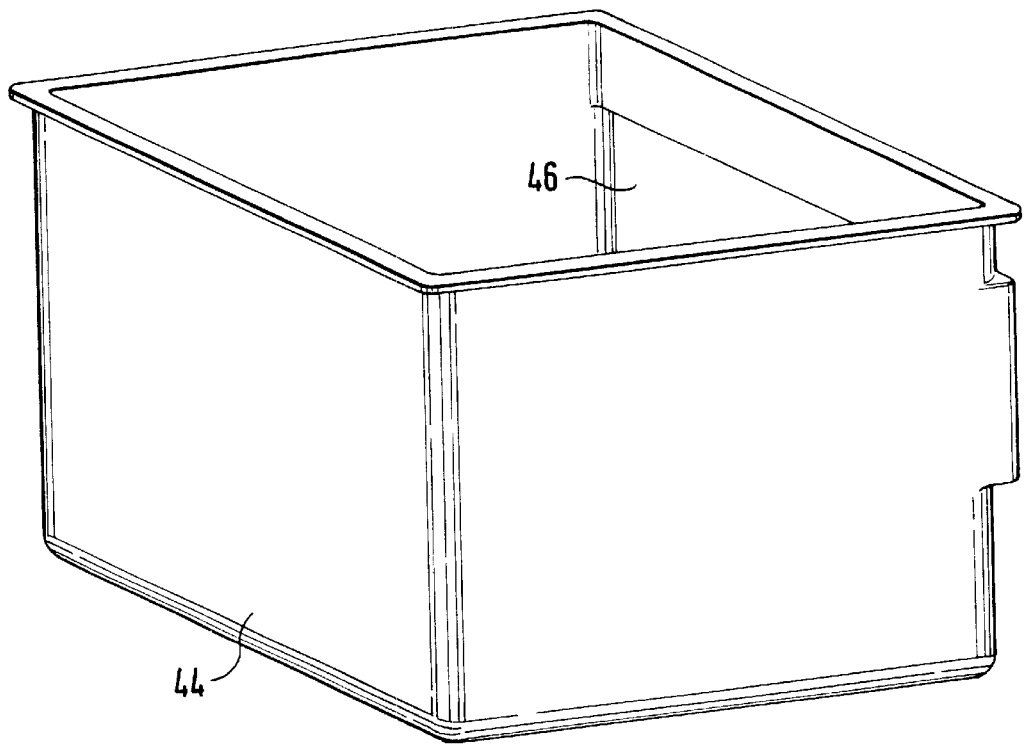

A storage compartment 10 according to the invention shown in exploded view in FIG. 1 comprises essentially a base member 12, a bottom 14 and a wall 16, which are manufactured from plastics material as injection-moulded parts. The base member 12 has a longitudinal wall 18, from the two ends of which project end walls 20. The bottom 14 is pivotable by means of a hinged joint through 90° out of a vertical position parallel to the base plate 12 into a horizontal position standing away from the base plate 12 at right angles. In its horizontal position, the bottom 14 is located at the lower edges of the end walls 20. The hinged joint is formed by two pins 22, which are inserted through holes 24 in the end walls 20 of the base part 12 into holes 26 of the bottom 14. The two pins 22 are arranged close to the longitudinal wall 18 and just above the lower edges of the end walls 20; they define a swivel axis of the bottom 14 parallel to the longitudinal wall 18. Helical torsion springs 28 are placed on the pins 22, the spring being supported, as is apparent from FIGS. 2 to 4, on the base part 12 and pressing the bottom 14 into the horizontal position.

Figure 5:
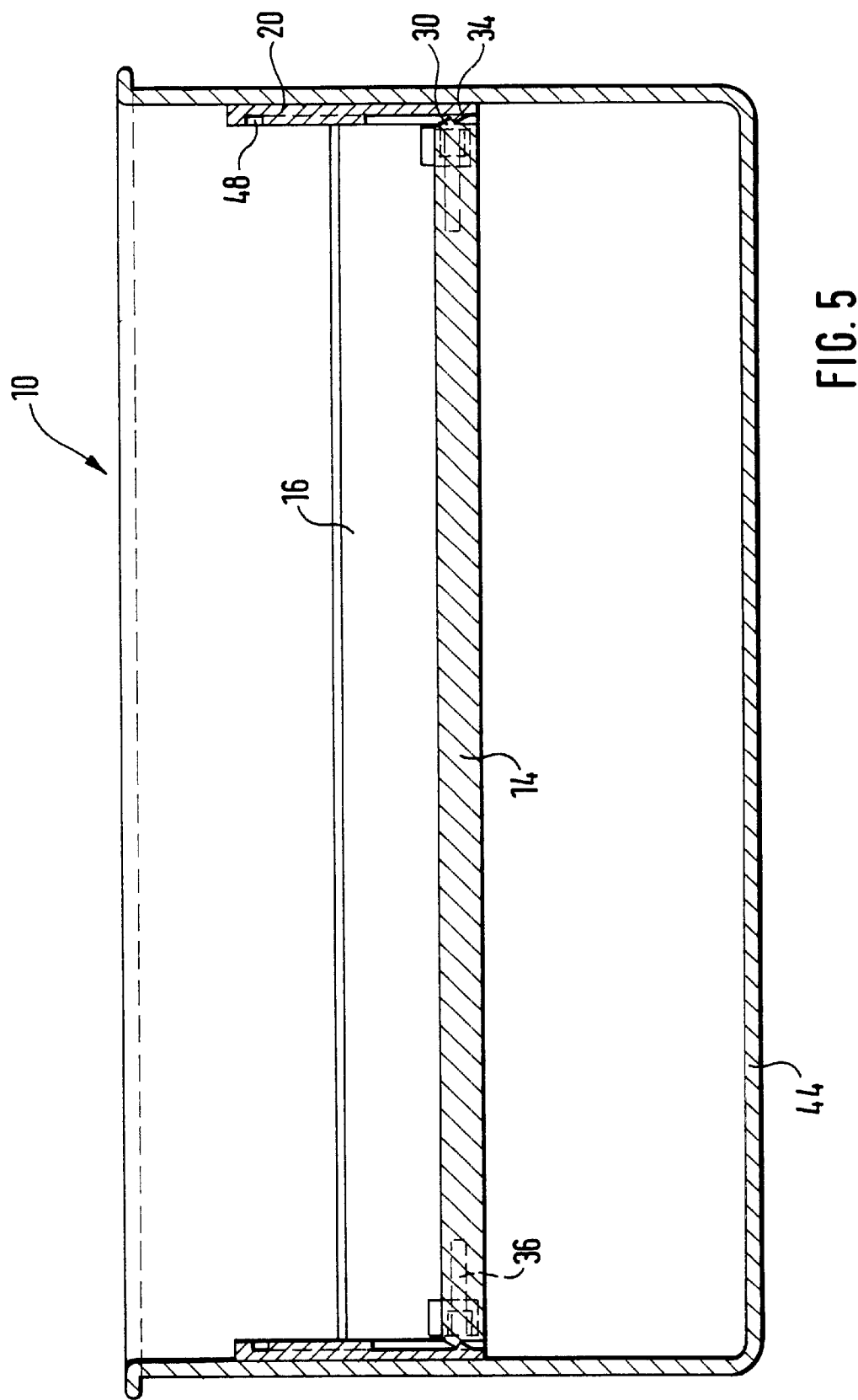
FIG. 5 shows a longitudinal section through the storage compartment of FIG. 1.

The bottom 14 has laterally projecting ribs 30, which, in the vertical position of the bottom, co-operate with snap-action projections 32 on the inner side facing one another of the end walls 20 and form a releasable holding arrangement 30. In the horizontal position of the bottom 14, the ribs 30 lie on supporting ledges 34 (compare FIG. 5), which are likewise arranged on the inner sides of the end walls 20 and together with the ribs 30 form an overload protection means 30, 34 of the storage compartment 10.

The wall 16 is pivotally connected to the bottom 14 and can be pivoted through 90° out of a position lying flat against the bottom 14 into a position standing away from the bottom. For the pivotal connection, the bottom 14 and the wall 16 have a hinged joint, which is formed by two pins 36, which are pushed through holes 38 in lugs on end faces of the wall 16 into holes 40 in the bottom 14. A helical torsion spring 42 is placed on the pins 36. The helical torsion spring 42 is supported on the bottom 14 and presses the wall 16 into the position standing away from the bottom 14.

The storage compartment 10 according to the invention can be inserted in a box-shaped container 44, which has in one side wall an aperture 46 for receiving the longitudinal wall 18 of the base part 12 of the storage compartment 10.

On the inner sides of the end walls 20 there are provided guideways 48, which are in the form of grooves and run in an arc (not necessarily a circular arc) around the holes 24 that define the pivot axis of the bottom 14. The spacing of the guideways 48 from the holes 24 changes: the guideways 48 could be regarded as portions of spirals that start near the holes 24 and run spirally away from the holes 24 over an angular portion of less than 180°. Spaced from the holes 38 in its lugs, the wall 16 has laterally projecting pegs 50, which form the guide elements and engage in the guideways 48. The fixed guideways 48 and the pegs 50 form a cam mechanism 48, 50 for the wall 16 pivotally connected to the bottom 14.

Figure 2:
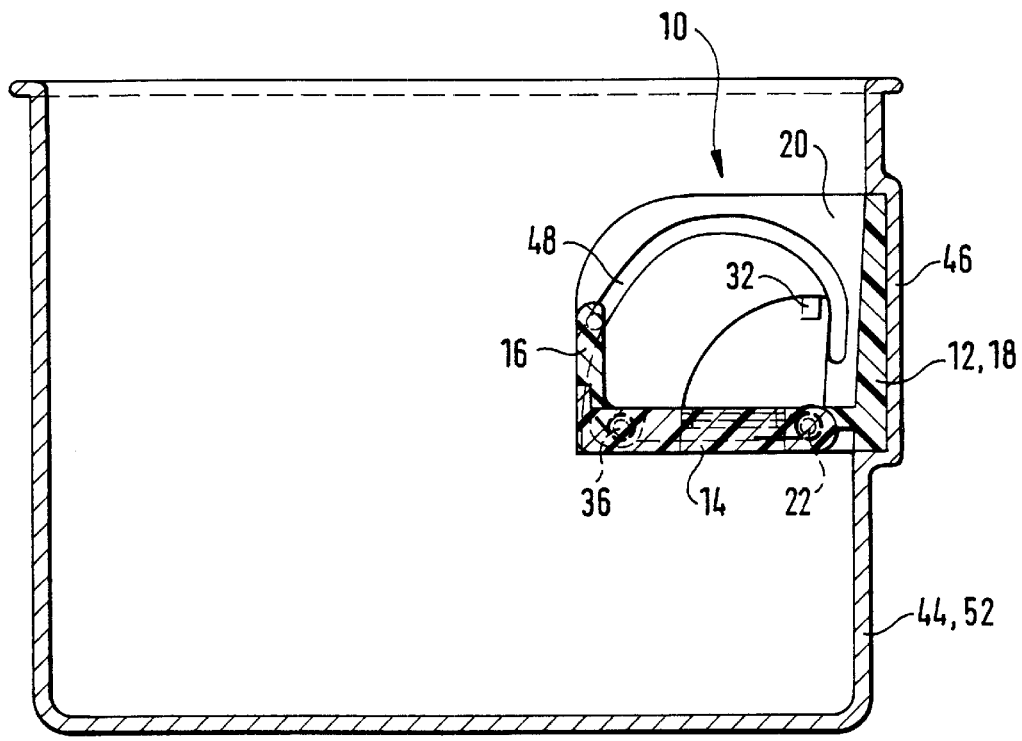
FIG. 2 shows a cross-section through the storage compartment of FIG. 1.

The function of the storage compartment 10 according to the invention is explained below with reference to FIGS. 2 and 3. FIG. 2 shows the storage compartment 10 in a position of use inserted in the container 44. The longitudinal wall 18 on the base member 12 of the storage compartment 10 is mounted on the inside of a side wall 52 of the container 44. The bottom 14 stands at right angles and horizontally away from the side walls 52 of the container 44 into the inner space of the container 44. The bottom 14 lies with its lateral ribs 30 on the supporting ledges 34 of the end wall 20 of the storage compartment 10, the helical torsion springs 28 pressing the bottom 14 into engagement with the supporting ledges 34. The wall 16 pivotally connected to the bottom 14 stands perpendicularly upwards away from the bottom 14. It is pressed into this position by the helical torsion springs 42 and held in this position by the pegs 50, which engage in the guideways 48.

Figure 3:
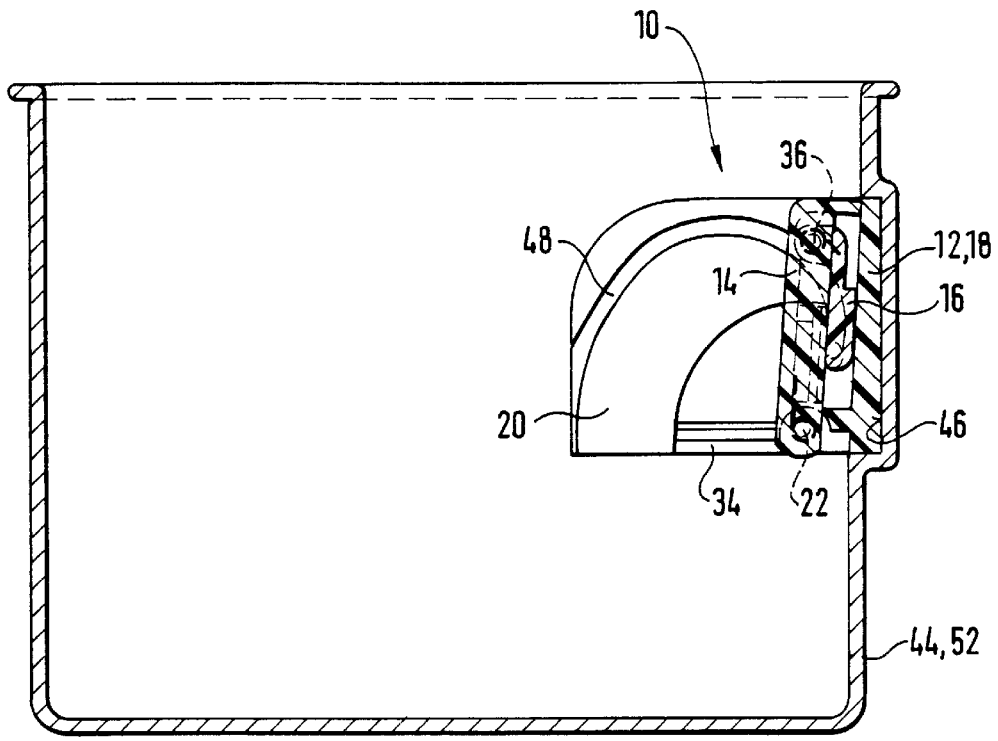
FIG. 3 shows a cross-section as shown in FIG. 2 when the storage compartment is not in use.

If the storage compartment 10 is not needed, it can be brought into the non-functional position shown in FIG. 3. To that end, the bottom 14 is pressed against the force of the helical torsion spring 28 upwards into the vertical position illustrated in FIG. 3. In the vertical position, between the bottom 14 and the longitudinal wall 18 there is a gap, in which the wall 16 lies. On pivoting the bottom 14 upwards, the wall 16, the pegs 50 of which slide in the guideways 48, is pivoted out of its position standing perpendicularly away from the bottom 14 into a position lying flat against the bottom 14 between the bottom 14 and the longitudinal wall 18. The guideways 48 and the pegs 50 form a cam mechanism 48, 50, which constrains the wall 16 to the pivot into contact with the bottom 14 as the bottom 14 is pivoted upwards. If the bottom 14 is pivoted back in the horizontal a position, the guideways 48 and the pegs 50 constrain the wall 16 to pivot into the position standing perpendicularly upwards away from the bottom 14.

In its position pivoted vertically upwards, the bottom 14 is held against the spring force of the helical torsion springs 28 by its lateral ribs 30, which snap in against the snap-action projections 32 of the end walls 20. To bring it into its functional position, the bottom 14 is pressed away from the longitudinal wall 18, the ribs 30 undergoing resilient deformation to overcome the snap-action projections 32 and the bottom 14 subsequently being pivoted by gravitational force and by the torsion spring elements 28 into the horizontal position. The ribs 30 of the bottom 14 and the snap-action projections 32 of the end walls 20 form a releasable holding arrangement 30, 32, which holds the bottom 14 in the vertical position against the force of the helical torsion spring 28.

Figure 4:
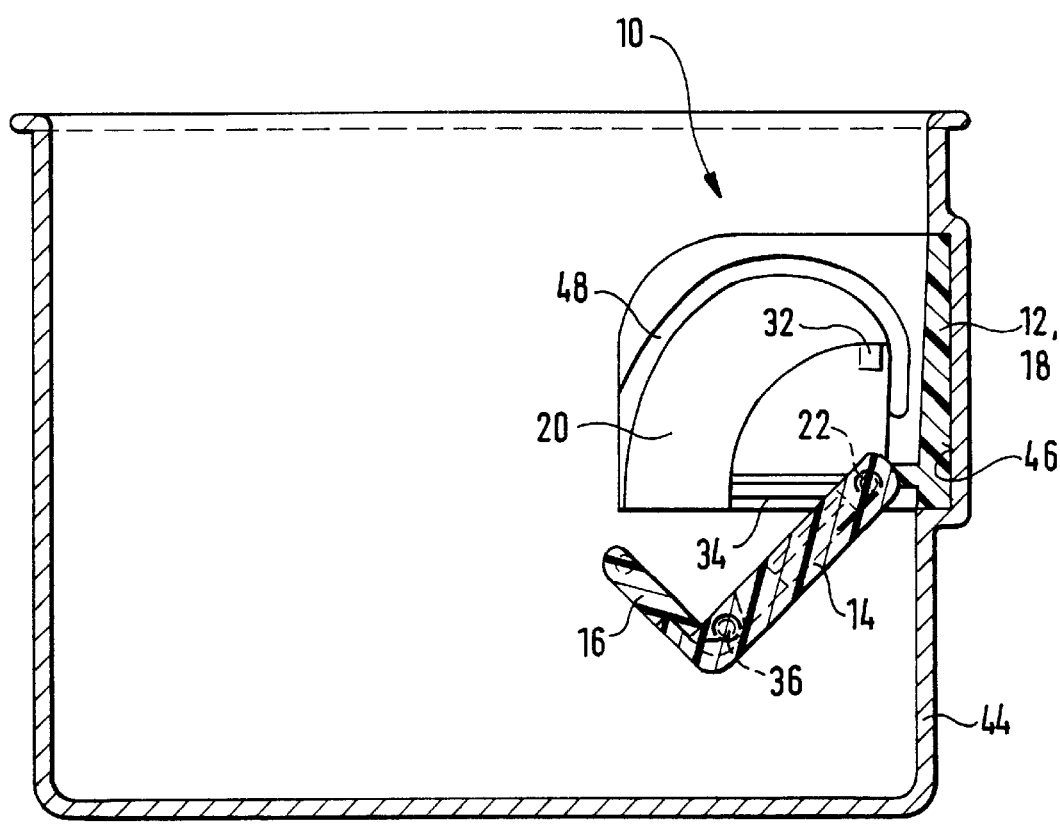
FIG. 4 shows a cross-section as shown in FIG. 2 with the storage compartment overloaded.

If the wall 16 or the bottom 14 of the storage compartment 10 is overloaded in the functional position, for example, because a heavy object is placed thereon, the ribs 30 of the bottom 14 undergo resilient deformation to overcome the supporting ledges 34 of the end walls 20, and the bottom 14, together with the wall 16, pivots beyond the horizontal position downwards, as shown in FIG. 4. The ribs 30 of the bottom 14, together with the supporting ledges 34 of the end walls 20, form an overload protection means, which enables the bottom 14 to fold away downwards together with the wall 16 when overloaded. After being overloaded, the bottom 14 is pressed upwards, until its ribs 30 have overcome the supporting ledges 34 and the storage compartment 10 is ready for use again.

It will be understood that each of the elements described above, or two or more together, may also find a useful application in other types of constructions differing from the types described above.

While the invention has been illustrated and described as embodied in STORAGE COMPARTMENT FOR A CONTAINER, ESPECIALLY IN A MOTOR VEHICLE, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claim is:

1. A storage compartment, comprising bottom pivotable by a first hinged joint out of a substantially horizontal position into a substantially vertical position; a wall pivotably mounted by a second hinged joint on said bottom and pivotable out of a position lying flat against said bottom into a position standing away from said bottom; a driving mechanism, wherein when said bottom is pivoted out of the substantially vertical position into the substantially horizontal position, said driving mechanism acts to pivot said wall out of said position lying flat against said bottom into said position standing away from said bottom, and wherein when said bottom is pivoted out of the substantially horizontal position into the substantially vertical position, said driving mechanism acts to pivot said wall out of said position standing away from said bottom into said position lying flat against said bottom.

2. A storage compartment as defined in claim 1, wherein said driving mechanism includes a cam mechanism.

3. A storage compartment as defined in claim 2, wherein said cam mechanism includes a guideway in a plane perpendicular to a pivot axis of said bottom, said guideway running in an arc and at a changing distance about the pivot axis of said bottom, said wall having a guide element which is arranged at a distance from a pivot axis of said wall and is in sliding engagement with said guideway.

4. A storage compartment as defined in claim 1, wherein said bottom is provided with an overload protection means which support said bottom in said substantially horizontal position, wherein said overload protection means allows said bottom to swivel downwards towards said wall when said bottom is overloaded.

5. A storage compartment as defined in claim 1, further comprising a spring element which presses said bottom into the substantially horizontal position and a releasable holding arrangement for retaining said bottom in the substantially vertical position against a force of said spring element.

6. A storage compartment as defined in claim 1; and further comprising a spring element which presses said wall into a position standing away from said bottom.

* * * * *